United States Patent [19]

Swiszcz

[11] Patent Number: 5,043,039

[45] Date of Patent: Aug. 27, 1991

[54] METHOD OF MANUFACTURE OF EXPANDABLE AND COLLAPSIBLE CELLULAR SHADES OF SHEER FABRIC

[75] Inventor: Paul Swiszcz, Boulder, Colo.

[73] Assignee: Hunter Douglas Inc., Upper Saddle River, N.J.

[21] Appl. No.: 526,963

[22] Filed: May 18, 1990

Related U.S. Application Data

[63] Continuation of Ser. No. 301,087, Jan. 25, 1989, abandoned.

[51] Int. Cl.[5] ........................ B32B 31/12; B32B 31/20

[52] U.S. Cl. .................................... 156/197; 156/227; 156/289; 156/292; 156/323; 156/537; 160/84.1; 428/116

[58] Field of Search ................ 428/116, 118; 156/537, 156/323, 289, 197, 70, 200, 227, 292; 160/84.1

[56] References Cited

U.S. PATENT DOCUMENTS

| | | | |
|---|---|---|---|
| 2,608,502 | 8/1952 | Merriman | 156/197 X |
| 4,174,987 | 11/1979 | Belvin et al. | 156/197 |
| 4,450,027 | 5/1984 | Colson . | |
| 4,631,217 | 12/1986 | Anderson . | |
| 4,673,600 | 6/1987 | Anderson . | |
| 4,676,855 | 6/1987 | Anderson | 156/193 |
| 4,677,012 | 6/1987 | Anderson . | |
| 4,677,013 | 6/1987 | Anderson . | |
| 4,685,986 | 8/1987 | Anderson . | |
| 4,732,630 | 3/1988 | Schnebly | 156/64 |

FOREIGN PATENT DOCUMENTS 6706563 of 1968 Netherlands .

*Primary Examiner*—Michael W. Ball
*Assistant Examiner*—Michele K. Yoder
*Attorney, Agent, or Firm*—Fleit, Jacobson, Cohn, Price, Holman & Stern

[57] ABSTRACT

A method for forming cellular shades using sheer materials. Strips of sheer material are creased to define tabs and central portions. Strips of a non-bonding material are placed over the central portions. Beads of adhesive are placed over the tabs and these assemblies are stacked, whereby the tabs are adhered to the central portions of the successive strip, while the non-bonding material prevents adhesion of the tabs to the central portions of the corresponding strips. When the adhesive has set, the non-bonding strips can be conveniently removed, yielding a cellular shade which can be formed of substantially any fabric material.

19 Claims, 2 Drawing Sheets

METHOD OF MANUFACTURE OF EXPANDABLE AND COLLAPSIBLE CELLULAR SHADES OF SHEER FABRIC

This is a continuation, of application Ser. No. 07/301,087, filed Jan. 25, 1989.

FIELD OF THE INVENTION

This invention relates to a method of manufacture of an improved cellular window shade. More particularly, the invention relates to a method of manufacture of an expandable and collapsible material for a cellular window shade, which consists of a number of horizontally-extending cells formed of fabric strips adhesively bonded to one another, according to which sheer fabrics not previously suited for manufacture of such shades may be employed.

BACKGROUND OF THE INVENTION

Processes are known for manufacturing of cellular shades, in which the body of the shade consists of a number of identical fabric strips, folded and adhesively-bonded to one another so as to define cells. Typically, the cells extend transversely, but they may also be arranged vertically, or at an angle to the horizontal. When the shade is raised, the cells are collapsed; when the shade is lowered, the cells expand. Such shades contain essentially static masses of air, and thus provide useful thermal insulation.

Conventionally, such shades are manufactured by creasing strips of fabric lengthwise to define cell precursors, and using a liquid adhesive to bond tabs thus formed on each successive strip to the central body portion of the next strip, completing the cells. U.S. Pat. No. 4,450,027 to Wendell B. Colson shows a method of and apparatus for making such shades from continuous fabric strip material. The adhesive bonding techniques employed heretofore in the manufacture of such shades have typically involved the positioning of beads of suitable adhesive on either the tabs or the central body portion of the next strip.

Other patents show related techniques. For example, U.S. Pat. Nos. 4,677,013, 4,685,986, 4,631,217, 4,677,012, and 4,676,855, all to Richard N. Anderson, show further methods of manufacture of cellular shades. For example, the strips may be creased to take a Z-shape, and tabs on either side of the strip are adhesively bonded to the prior and successive strips to form the completed shade structure. See also U.S. Pat. No. 4,732,630 to Schnebly, and U.S. Pat. No. 4,849,039 to Colson and Swiszcz.

All of these patents and applications thus teach adhesive bonding of tabs formed on a strip of material to a preceding strip using a liquid adhesive, or in some cases to both preceding and successive strips, to form the cells. This technique is the most practical known, but has effectively limited the types of fabrics from which such shades can be made. Specifically, the material comprising the shade is normally stacked with the cells in the collapsed position while the liquid adhesive cures. In this position, the adhesive on the tabs of each strip is normally juxtaposed to the strip from which the tabs are formed, as well as the strips to which the tabs are to be bonded. Accordingly, the fabrics have had to have been selected such that the adhesive does not penetrate the fabric, so that the tabs from a first strip do not adhere to the strip from which they are formed, but only to the strips to which they are to be bonded; i.e., so that the interiors of the cells are not bonded closed.

This limitation on the method of forming shades shown in the patents mentioned above has been such that certain highly desirable "sheer" fabrics have not been usable. "Sheer" as used in this specification refers to fabrics which are highly translucent or are substantially transparent to visible light. Such sheer fabrics are normally relatively open weave, and are typically woven or knit of monofilament thread. When a bead of conventional adhesive sufficient to form a good bond when employed to form cellular blinds of typical non-sheer materials is placed on these open-weave sheer fabrics, the adhesive tends to penetrate the fabric, particularly if pressure is exerted thereon to ensure a good bond. Thus, if sheer materials are used in the normal manufacturing process, the inner walls of the cells tend mutually to adhere, which ultimately prevents the blind from opening properly. This difficulty has in fact prevented manufacture of cellular shades of sheer materials, especially fabrics, permeable to liquid adhesives, which would be highly desirable to many consumers.

Various methods have been tried for adhesive manufacture of such cellular shades using sheer materials. Bands of heavier material have been knit into the sheer material at the locations where the adhesive is applied, to slow passage of the adhesive therethrough. In most cases this material was very difficult to handle and roughly twice as expensive as the plain sheer material. Using a more viscous adhesive which does not penetrate the fabric also has proven unsatisfactory.

It appears that successful adhesive bonds between open-weave sheer fabrics, particularly those knit or woven of monofilament materials, require impregnation and solidification of the adhesive, wherein the adhesive actually penetrates through the fabric and then solidifies into a more or less solid mass encapsulating the fibers. If the adhesive is made too viscous it cannot penetrate the fabric. This is less of a problem with tightly woven conventional fabrics, wherein the fibers normally have many small "hairy" sub-fibers, which provide sufficient surface area to which the adhesive adheres that a good bond can be formed without encapsulation. To a considerable extent adhesives which do not permeate the fabric have been successfully employed to form cellular shades, e.g. according to the Colson and other patents discussed above, of opaque, non-sheer fabrics. Open-weave sheer fabrics do not provide sufficient surface area to allow formation of a strong non-impregnating bond. Particularly where the fabric is knit or woven of monofilament thread which is not "hairy", the impregnation mode of adhesion is required to form an effective bond. In either case, when the impregnation occurs, the tabs tend to be bonded to both their own and the preceding and/or successive strips, preventing the blind from opening properly.

U.S. Pat. No. 4,673,600 also to Richard N. Anderson addresses this problem. According to this patent, sheer materials can be formed into "honeycomb" or cellular shades and adhesively bonded by allowing the adhesive to cure while the cells are in the expanded state. This method is useful if quick-setting adhesives, e.g. hot melt adhesives, are used. However, this method poses certain constraints on the design of the cellular shade thus manufactured, and on the manufacturing processes employed.

SUMMARY OF THE INVENTION

Accordingly, it is an object of the invention to provide a method of manufacture of cellular shades of materials permeable to liquid adhesives, particularly sheer, essentially open-weave fabric materials, which may be knit or woven of monofilamentary thread.

It is a further object of the invention to provide such a method which yields a reasonably priced product.

It is a further object of the invention to provide a method of manufacture of an adhesively-bonded, expansible and collapsible cellular material for shades of sheer fabric, according to which the adhesive bonds are at least partially cured while the cells are in the collapsed position.

According to the invention, the individual strips making up the cells are creased to define tabs and central portions of the strips making up the cells. A strip of non-bonding material is then inserted so as to be disposed between the tabs and the portions of the preceding and/or successive strips to which the tabs are to be bonded. Adhesive is then applied to the two tabs, or to the corresponding positions on the preceding and/or successive strips, and these assemblies are stacked, whereby the adhesive on each tab adheres to the body of the preceding and/or successive strip, and so on, forming the shade. This assembly is exposed to adhesive cure conditions which ensure that a suitable bond is obtained. This can be done in a continuous process as shown in Colson U.S. Pat. No. 4,450,027, and the other patents discussed above. The shade may then be expanded by stretching it vertically and removing the strips of non-bonding material.

BRIEF DESCRIPTION OF THE DRAWINGS

The invention will be better understood if reference is made to the accompanying drawings, in which.

DESCRIPTION OF THE PREFERRED EMBODIMENTS

Figure 1:
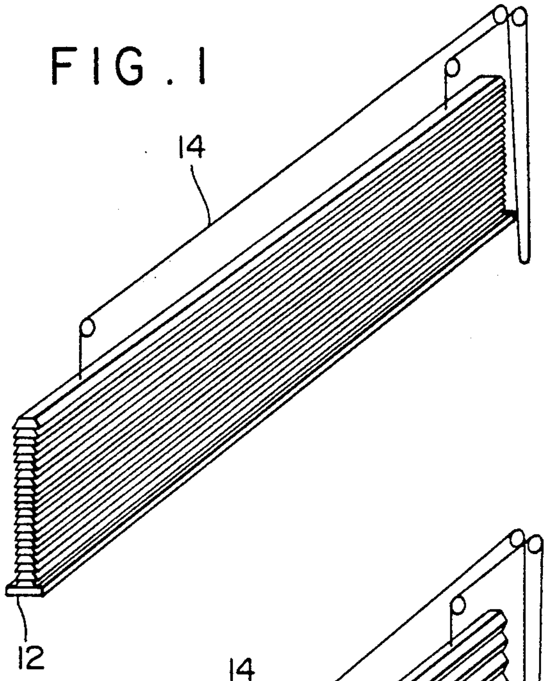
FIG. 1 shows a perspective view of a shade according to the invention in the open position.
Figure 2:
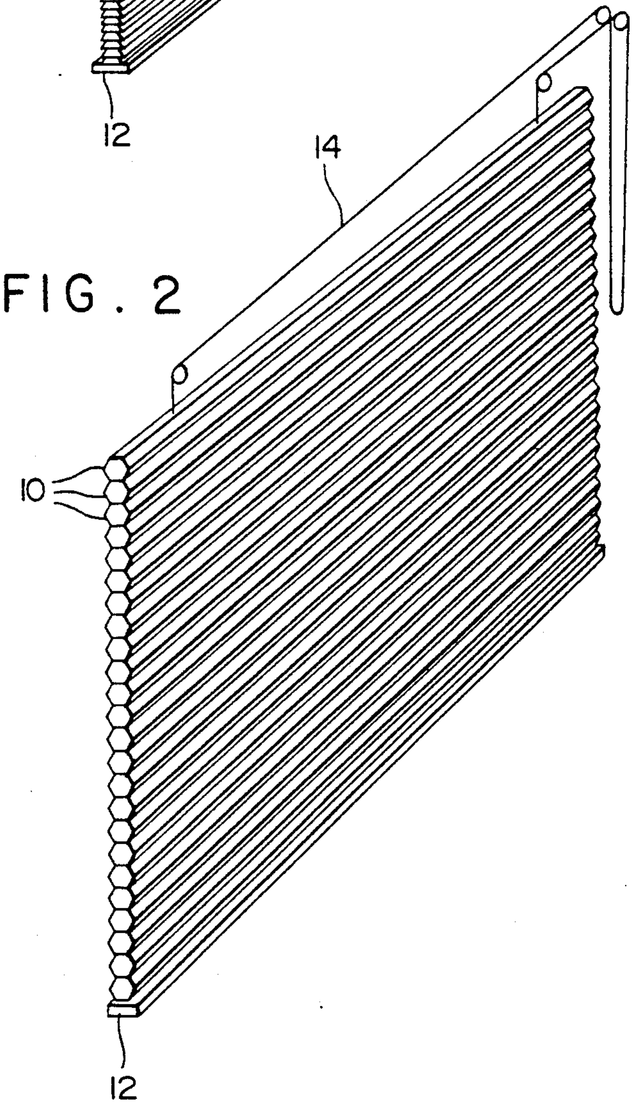
FIG. 2 shows a corresponding perspective view of the shade according to the invention in the closed position.

As indicated above, FIG. 1 shows the shade of the invention in the shades-open position, that is, wherein the shade is drawn upwardly letting light flow unimpeded through an accompanying window (not shown), while FIG. 2 shows the corresponding shades-closed position. As can be seen, the shade of the invention comprises a number of cells indicated generally at 10 which extend transversely to the window. In the FIG. 2 configuration the cells are expanded, exhibiting a generally polygonal cross-section, while in the FIG. 1 condition they are shown having been compressed by drawing a base member 12 upwardly. The arrangement of draw cords 14 shown controlling the motion of the base member 12 is strictly schematic and by no means a limitation on the invention. Preferably, as indicated, the cords pass through the centers of the cells and are invisible. In the expanded position of FIG. 2 the cells each essentially retain static air masses, which serves as very useful window insulation. The open ends of the cells may move within U-shaped vertical end caps to assist in retention of air therein.

As can be appreciated, the requirement therefore is for a cellular structure which can be readily expanded from the compressed configuration of FIG. 1 to the relatively expanded configuration of FIG. 2, all without undue mechanical complexity or expense of manufacture and while retaining a pleasing appearance.

Economical manufacture of such a shade is best accomplished by adhesively joining tabs formed of the edges of strips of fabric material corresponding to the cells to corresponding portions of preceding and/or succeeding strips.

Figure 5:
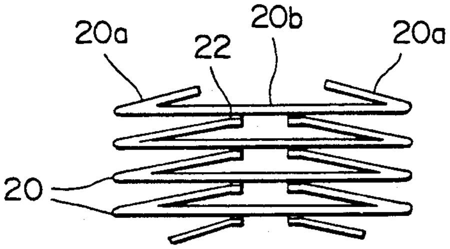
FIG. 5 (PRIOR ART)
FIG. 5 shows a typical prior art construction using a non-sheer material.

FIG. 5 shows a conventional prior art construction, which may be carried out according to the teachings of Colson U.S. Pat. No. 4,450,027, in which successive strips of fabric 20 have been creased to define tabs 20*a* and central portions 20*b*. The tabs 20*a* are adhesively bonded to the central portions 20*b* by conventional adhesives as at 22. The fabric used in this prior art embodiment is not sheer and is essentially impermeable or only slightly permeable to the adhesive, such that the shade material can be manufactured simply by putting a bead of adhesive on the tabs 20*a* and stacking the strips such that they are aligned with the central body portions 20*b* of successive strips. After the adhesive has set, the material of the shade is essentially completed.

According to the present invention, as described above, it was desired to employ a sheer fabric material which is typically translucent or transparent in the structure of FIG. 5. Such materials tend to be of open weave construction to let light pass through freely and are commonly knit or woven of monofilament synthetic fibers. Such monofilament fibers are very smooth-surfaced, such that they do not present small hairs or subfibers to which the adhesive can bond. The open weave fabrics in general comprise relatively few fibers. Therefore, in order to form a suitable bond, the adhesive must penetrate the sheer fabric, such that when it hardens into a mass, it encapsulates the fibers of the fabric.

Figure 3:
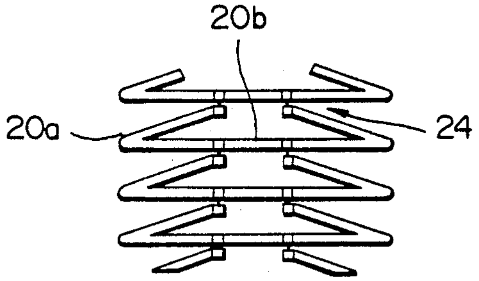
FIG. 3 shows a typical problem occurring where insufficient adhesive has been used to form a suitable bond between sheer materials.
Figure 4:
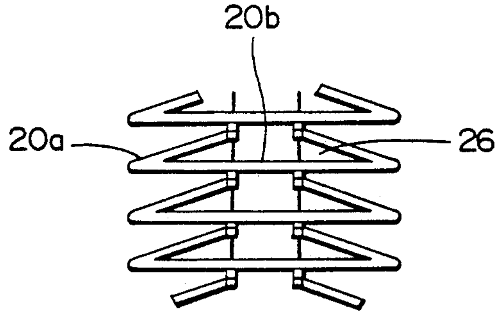
FIG. 4 shows a typical problem occurring where excessive adhesive has caused adjacent layers of sheer materials to adhere to one another.

Applicant finds that in doing so, using the conventional construction of FIG. 5, and using the adhesives used successfully with non-sheer opaque fabrics, the adhesive tends to bond the tabs 20*a* of each strip not only to the central portions 20*b* of the successive strip, as desired, but also to the central portion of the same strip, which prevents the shade from being opened. FIG. 4 shows this schematically. If an adequate amount of adhesive is provided to form a substantial bond, some of it is extruded through the open weave of the sheer material when the strips are stacked to form the bond. A string of adhesive 26 then tends to join the tabs 20*a* and the central portions 20*b* of each strip, which prevents the shade from opening properly. FIG. 3 shows a typical result when a smaller amount of adhesive is used to try to avoid this problem. Essentially the adhesive bonds which are formed are very narrow, as shown at 24, and tend to break, or are nonexistent; either condition leads to immediate failure of the shade.

For similar reasons, modification of the adhesive viscosity alone is not sufficient to solve this problem. If the adhesive is made thicker, it does not penetrate and encapsulate the fabric; if too thin, it tends to diffuse through the fabric and does not form an adequate bond.

Figure 6:
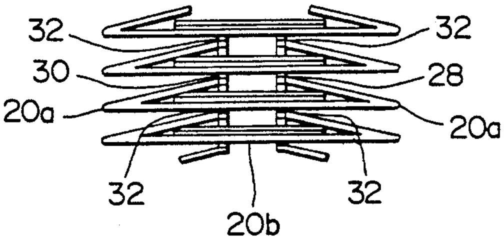
FIG. 6 shows an intermediate stage in the process of the method of the invention.

According to the invention, and as shown in cross-section in FIG. 6, a strip 28 of non-bonding material, that is, a material which does not bond to the adhesive used, is interposed between the tabs 20*a* and the central portions 20*b* of the sheer fabric used. The adhesive is then applied as two spaced beads as indicated at 32 to the upper surfaces of the tabs, and the assembly made as previously. As shown in FIG. 6, the applied adhesive and the non-bonding material are aligned one above the other and the total width of the non-bonding material is greater than the combined width of the adhesive beads. The adhesive will normally penetrate the tabs 20*a* and central portions 20*b*, but does not bond to the non-bonding strips 28. When the adhesive has cured, the non-bonding strips 28 can be removed.

Figure 7:
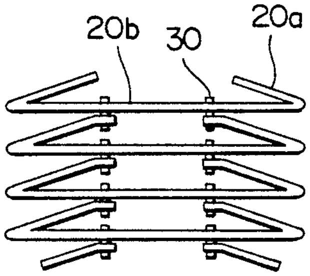
FIG. 7 shows the shade of the present invention after manufacture in the open position.
Figure 8:
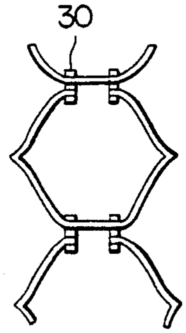
FIG. 8 shows the shade of the present invention in the closed position.

FIGS. 7 and 8 show the shade formed of a sheer material according to the invention after removal of the non-bonding strips 28. As can be observed, the adhesive 30 tends to penetrate the central portions 20*b* of the strips but has been prevented from adhering to the corresponding tabs 20*a* by the presence of the non-bonding material 28 as shown in FIG. 6. When the shade is opened, as shown in FIG. 8, the adhesive 30 then extends above the central portion of each strip, but does not interfere with the proper operation of the shade.

Figure 9:
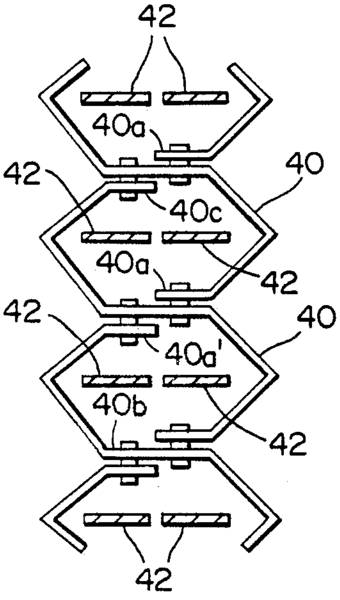
FIG. 9 shows an alternative embodiment of the shade according to the invention.

FIG. 9 shows an alternative form of "honeycomb" or cellular shade, as described for example in U.S. Pat. No. 4,676,855 to Anderson, which can be manufactured of adhesive-permeable sheer materials according to the method of the invention. In this case, the basic member of the cell is a strip of material 40 creased to define an overall Z-shape, with tabs 40*a* on either side of a central section. The tabs of each strip are joined to the central portions of the preceding and succeeding strips. If the strips 40 are formed of a glue-permeable material, adhesive is applied, and the strips stacked, the tabs 40*a* will tend to be adhesively bonded to the strips from which they are formed; e.g., tab 40*a'* will tend to be bonded to the same strip 40 at a point 40*b*. According to the invention, strips 42 of a non-bonding material are inserted into the interior spaces of the cells before the strips are stacked, to prevent the interiors of the cells from thus being adhesively bonded closed. Strips 42 are removed when the adhesive has at least partially cured. The method of the invention is similarly applicable to other honeycomb-configuration cellular shades.

The principal steps in the practice of the invention are simply the formation of the strips by creasing them to define the tabs and central portions of cell precursors, insertion of the non-bonding material, deposition of beads or droplets of liquid adhesive along the tabs or on the corresponding mating portions of the strips, and stacking a large number of these assemblies to form the shade precursor. After exposure of the shade precursor to suitable conditions for cure of the adhesive, the strips of non-bonding material are simply removed, yielding the completed structure.

According to the invention, the preferred material for the non-bonding strips may be a polyethylene plastic to which the adhesive does not bond. A nonstick silicone coating on the strips may be desirable in connection with certain combinations of adhesives and polyethylenes or other materials for the strip. Numerous other appropriate materials will occur to those of skill in the art. Various sorts of adhesives such as water activated catalyst adhesives, hot melt glues, moisture-curing hot melts and various silicones are all suitable. Adhesives applied dry and activated by heating after stacking of the strips, with or without application of pressure, may also prove useful in the future. It will be appreciated that the key is that the adhesive must penetrate the fibers of the fabric to fully encapsulate them, forming a suitable bond, and must be sufficiently viscous to remain in place during the various processing steps.

Removal of the non-bonding strips 28 can be feasibly accomplished simply by laborers using their fingers, but obviously more mechanized approaches may also be economically feasible in some circumstances. Applicant does find that certain desirable fabrics are sufficiently permeable to air that it is not satisfactory to simply blow the strips of non-bonding material out from the cells thus formed.

The other details of manufacturing the shade according to the invention are generally as shown in the various U.S. Patents and pending applications referred to above.

While a preferred embodiment of the invention has been disclosed and discussed in detail, this is not to be considered a limitation on the invention, but only exemplary thereof. Accordingly, the invention should not be limited by the above disclosure, but only by the following claims.

I claim:

1. Method of manufacture of a vertically expandable and collapsible fabric shade comprising a number of elongated cells bonded together by adhesive, said cells each being formed identically of a strip of fabric creased along longitudinal lines to define the cross-sectional outline of the cell, comprising the steps of:

supplying strips of a sheer fabric comprising a monofilamentary fiber;

creasing each said strip lengthwise in order to form tabs of fabric on either side of a central portion of the strip, and to form a plurality of cell precursors from said strips for bonding to one another by an adhesive to form the shade;

inserting at least one strip of non-bonding material into the interior of each cell precursor, said non-bonding material being one that does not bond to said adhesive;

applying said adhesive to the cell precursor at the points at which said tabs are to be bonded to the corresponding portions of other cell precursors with said applied adhesive and non-bonding material being aligned one above the other;

stacking said cell precursors atop one another, such that the adhesive on each is brought into contact with the corresponding portion of the successive and/or preceding cell precursor, said adhesive being applied in an amount such that the adhesive encapsulates the fibers of the cell precursors where they are to be bonded, and whereby said non-bonding material prevents the tabs of each cell precursor from being bonded to the strip from which it is formed;

allowing said adhesive to cure; and removing said strips of non-bonding material.

2. The method of claim 1, wherein said stacked assemblies are subjected to pressure to ensure that said adhesive fully bonds said tabs to said central portions.

3. The method of claim 2, wherein heat is applied to cure said adhesive.

4. The method of claim 1, comprising the further step of expanding said cells to permit removal of said strips of non-bonding material.

5. The method of claim 1, wherein said cell precursors are generally U-shaped in cross-section.

6. The method of claim 1, wherein said cell precursors are generally Z-shaped in cross-section.

7. The method of claim 1, wherein said adhesive is applied as a longitudinal bead extending along each of said tabs of fabric on each strip and the total width of the non-bonding material is greater than the combined width of the adhesive beads.

8. Method of manufacture of expandable and collapsible cellular shade material comprising a number of superimposed longitudinal hollow cells, said cells each being formed of sheet material permeable to liquid adhesives, comprising the steps of:

providing the sheet material, said material being a sheer material consisting of monofilamentary fibers, in a strip form;

folding the strip material along parallel lines in a longitudinal direction corresponding to the longitudinal direction of the cells to be formed;

applying adhesive in liquid state to one or more areas of the strips of sheet material, said adhesive being applied in quantities such that it permeates and upon curing encapsulates the fibers of the portions of the material to be bonded;

positioning at least one strip of non-bonding material with respect to the folded strip of sheet material with the applied adhesive being aligned above and below the non-bonding strip so that during subsequent steps said non-bonding material will prevent any portion of a particular strip of sheet material permeated with adhesive from adhering to any other portions of the same strip of sheet material in a manner which would prevent formation of a cell, said non-bonding material being one which does not bond to said adhesive;

stacking said strips so as to bring together the parts of the strips of sheet material to be mutually adhered in direct contact to form the cells;

allowing the adhesive to cure; and removing said strips of non-bonding material.

9. The method of claim 8 wherein said strips of sheet material are formed generally to take a Z-shaped cross-section.

10. The method of claim 8, wherein said adhesive is applied as one or more longitudinal beads extending along the strips of sheet material and the total width of the non-bonding material is greater than the combined width of the adhesive beads.

11. Method of manufacture of expandable and collapsible cellular shade material comprising a number of superimposed longitudinal hollow cells, said cells each being formed of sheet material permeable to liquid adhesive, said method comprising the steps of:

forming a strip of said sheet material, said material being a sheet material consisting of monofilamentary fibers;

creasing said strip lengthwise on each longitudinal side of the strip of sheet material at a certain distance from the respective side each of the strip of sheet material, in order to define tabs on either side of a central portion of said strip;

positioning at least one strip of non-bonding material over at least the central part of said central portion to be aligned with adhesive subsequently applied to said tabs and/or said central part of the strip of sheet material, said non-bonding material being one which does not bond to said adhesive;

folding over the longitudinal side portions of said strip of sheet material including said two tabs along lines parallel to the central axis of the strip of sheet material to at least partially enclose said nonbonding material, forming a cell precursor assembly;

applying a liquid adhesive along the strips of sheet material at the location of each said tabs and/or at the corresponding locations of the central part of said strips of sheet material which will confront each other after folding-over of the side portions, in a quantity such that the adhesive permeates the material and at least a portion of the adhesive is forced through the strip material in subsequent processing steps;

stacking a plurality of said assemblies atop one another, such that the tabs of each said strip of sheet material are brought into close contact with the corresponding locations of the central part of an adjacent one of said of said strips of sheet material, with the adhesive disposed between said tabs and said corresponding locations;

allowing said adhesive to cure; and removing said non-bonding material;

whereby said non-bonding material aligned with said adhesive prevents the portion of adhesive forced through the strip material from contacting any other portion of the strip material in order to prevent the tabs from being adhered to the strips from which they are formed.

12. The method of claim 11 wherein said strips of sheet material are creased to take a U-shape in cross-section.

13. The method of claim 10, wherein said liquid adhesive is applied as a longitudinal bead extending along each of said tabs of said strip of sheet materials and the total width of the non-bonding material is greater than the combined width of the adhesive beads.

14. Method of manufacture of expandable and collapsible cellular material comprising a plurality of stacked longitudinal hollow cells adhered to adjoining cells above and below over a portion of their width, said method comprising the steps of:

providing a continuous strip of material comprising individual fibers;

folding the strip material along parallel lines in a longitudinal direction corresponding to the longitudinal direction of the cells to be formed;

applying adhesive to the strip material in at least one continuous longitudinal line only at locations corresponding to the location of adhesion to adjoining cells, said adhesive being applied in amounts sufficient to permeate and encapsulate the fibers of the strip material with at least a portion of the applied adhesive being forced through the strip material in subsequent processing steps;

positioning at least one strip on non-bonding material with respect to the folded portions of the strip material with the non-bonding material being aligned with said adhesive line thereby preventing any adhesive forced through the strip material from contacting and adhering to any other portion of the strip material;

stacking the strip material to bring into contact the portions of each strip to be adhered together to form the stack of longitudinal cells; and allowing the adhesive to cure.

15. The method of claim 14, which further comprises removing the strips on non-bonding material.

16. The method of claim 14, wherein the non-bonding material has a total width at least equal to the width of said applied adhesive.

17. The method of claim 14, wherein:

the strip material is folded over itself to form two folded over edge portions and a middle portion with the edge portions disposed on one side of the middle portion;

the adhesive is applied in two parallel lines to the folded over edge portions, with said parallel lines defining between their outer edges an adhesive width; and the non-bonding material is positioned between the folded over edge portions and the middle portion and has a total width at least equal to said adhesive width.

18. The method of claim 14, wherein:

the strip material is folded over itself to form two folded over edge portions and a middle portion with a first edge portion lying on one side of the strip material and a second edge portion lying on the outer side of the strip material;

the adhesive is applied in two parallel lines with one line applied on an edge portion and a second line applied on the middle portion; and the non-bonding material is positioned in alignment with each folded over edge portion and has a total width at least equal to the width of the adhesive line adjacent to it through said strip material.

19. The method of claim 14, wherein the non-bonding material is one which does not bond to said adhesive whereby the non-bonding material allows adhesion to occur in specific locations completing the cell formation and prevents adhesion between layers of strip material in other locations without otherwise affecting the adhesion process.

* * * * *